United States Patent
Adcook

(10) Patent No.: US 8,912,950 B2
(45) Date of Patent: Dec. 16, 2014

(54) INTERFERENCE MITIGATION IN THROUGH THE WALL RADAR

(75) Inventor: Scott E. Adcook, Irvine, CA (US)

(73) Assignee: Raytheon Company, Waltham, MA (US)

( * ) Notice: Subject to any disclaimer, the term of this patent is extended or adjusted under 35 U.S.C. 154(b) by 307 days.

(21) Appl. No.: 13/429,249

(22) Filed: Mar. 23, 2012

(65) Prior Publication Data

US 2013/0249730 A1    Sep. 26, 2013

(51) Int. Cl.
*G01S 13/538* (2006.01)
*G01S 13/04* (2006.01)
*G01S 13/88* (2006.01)
*G01S 13/00* (2006.01)

(52) U.S. Cl.
USPC ............ 342/159; 342/21; 342/22; 342/27; 342/28; 342/89; 342/90; 342/91; 342/160; 342/162; 342/175; 342/195; 342/196

(58) Field of Classification Search
CPC ............ G01S 7/02; G01S 7/28; G01S 7/285; G01S 7/292; G01S 7/2922; G01S 7/41; G01S 7/414; G01S 13/02; G01S 13/04; G01S 13/06; G01S 13/08; G01S 13/10; G01S 13/18; G01S 13/50; G01S 13/52; G01S 13/56; G01S 13/88; G01S 13/887; G01S 13/888; G01S 13/89
USPC ........... 342/21, 22, 27, 28, 59, 61, 68, 70–72, 342/82, 89–103, 118, 134, 137, 159–164, 342/175, 192–197, 350, 378–380, 176, 179
See application file for complete search history.

(56) References Cited

U.S. PATENT DOCUMENTS

| | | | | |
|---|---|---|---|---|
| 3,875,569 A | * | 4/1975 | Hill et al. | 342/90 |
| 3,924,234 A | * | 12/1975 | Cash et al. | 342/92 |
| 3,985,080 A | * | 10/1976 | Kostecki | 342/68 |
| 4,015,261 A | * | 3/1977 | Campbell | 342/137 |
| 4,096,480 A | * | 6/1978 | Miner et al. | 342/68 |

(Continued)

FOREIGN PATENT DOCUMENTS

EP    2 073 037 A1    6/2009

OTHER PUBLICATIONS

Written Opinion of the International Searching Authority for International Application No. PCT/US2013/022598, filed Jan. 22, 2013, Written Opinion of the International Searching Authority mailed Oct. 14, 2013 (6 pgs.).

(Continued)

*Primary Examiner* — Bernarr Gregory
(74) *Attorney, Agent, or Firm* — Christie, Parker & Hale, LLP

(57) ABSTRACT

This invention relates to sense through the wall radar. A main channel of a radar system (12) is operated at a frequency capable of penetrating opaque barriers such as the wall (24) of a building (22) to sense targets (16) therein. The main channel performance may be impaired by multipath interference, i.e., radar returns resulting from targets (20) outside the building (22) illuminated by reflection from the wall (24). A guard channel of the radar, operating at a higher frequency which does not penetrate the wall (24), is used to identify targets (20) outside the building (22) and suppress the multipath interference they produce in the main channel.

14 Claims, 4 Drawing Sheets

(56) References Cited

U.S. PATENT DOCUMENTS

| | | | | |
|---|---|---|---|---|
| 4,298,872 | A * | 11/1981 | Rodgers | 342/380 |
| 4,333,079 | A * | 6/1982 | Dick et al. | 342/68 |
| 5,539,412 | A * | 7/1996 | Mendelson | 342/192 |
| 6,909,397 | B1 * | 6/2005 | Greneker, III et al. | 342/159 |
| 7,411,542 | B2 * | 8/2008 | O'Boyle | 342/70 |
| 8,169,362 | B2 * | 5/2012 | Cook et al. | 342/162 |
| 2011/0025494 | A1 | 2/2011 | Adcook et al. | |
| 2011/0025545 | A1 | 2/2011 | Cook et al. | |
| 2011/0025546 | A1 | 2/2011 | Cook et al. | |

OTHER PUBLICATIONS

International Search Report for International Application No. PCT/US2013/022598, filed Jan. 22, 2013, International Search Report dated Oct. 8, 2013 and mailed Oct. 14, 2013 (3 pgs.).

* cited by examiner

INTERFERENCE MITIGATION IN THROUGH THE WALL RADAR

CROSS-REFERENCE TO RELATED APPLICATION(S)

This application is an improvement upon and incorporates by reference in its entirety, as if set forth in full, U.S. patent application Ser. No. 12/462,378, filed on Aug. 3, 2009 ("the '378 Application"), now U.S. Pat. No. 8,169,362.

BACKGROUND

1. Field

Embodiments described herein relate to sense through the wall radar systems and in particular to systems for mitigating interference in sense through the wall radar.

2. Description of Related Art

Radar systems capable of sensing personnel through opaque barriers are of use to the military and to law enforcement. In a typical application, a radar unit may be deployed outside a building, and it may illuminate personnel, or targets, inside the building, with radio-frequency (RF) electromagnetic waves capable of penetrating the wall of the building. Reflections from the targets then return to the radar unit, passing through the wall again on their return, and are detected by the radar unit. The presence of human targets may then be inferred by a processing unit in the radar unit, and their locations may be communicated to the radar operator through an operator interface, which may include a graphical display.

Reliably identifying targets inside the building may be challenging because of multipath interference. For example, some of the radar radiation may reflect off of the wall, reflect from a target outside the building, and then reflect from the wall again, returning to the radar unit. This reflection from a target outside the building may be mistaken by the radar unit for, and incorrectly displayed to the radar operator as, a target inside the building. The problem of multipath may be exacerbated in sense through the wall applications by the attenuation caused by a wall, as a result of which the signal returning from a desired target inside the building may be weak compared to the signal returning from an undesired target outside the building.

Some undesired targets, both inside and outside the building, may be eliminated by suppressing stationary targets, using for example signal processing steps described in the '378 Application. Signals reflected from personnel inside the building may survive this suppression method even if the targets are intentionally standing still, because even a person attempting to stand perfectly still will move slightly as a result of heartbeat, breathing, and involuntary postural sway. Because these techniques suppress signals from stationary targets, they may not suppress multipath interference from undesired moving targets, such as personnel and wind-blown foliage outside the building.

A prior art approach to mitigating multipath interference involves equipping the radar unit with a rear-facing low gain receiving "guard" antenna. This antenna is more sensitive to reflections from undesired targets behind the radar than the main antenna, which is aimed into the building. Reflections detected by the main channel receiver which are also detected in the guard channel are then suppressed by the processing unit, so that they are not displayed to the radar operator. Although this approach helps to reduce the errors caused by multipath, its performance may be inadequate because reflections from inside the building may also reach the guard antenna, through a side lobe of this antenna or after reflection from the operator, resulting in the incorrect rejection by the processing unit of targets inside the building.

There is a need, then, for a system capable of reliably identifying multipath signals in sense through the wall radar systems.

SUMMARY

Embodiments of the present invention provide a system and method for sense through the wall radar including mitigation of multipath interference. A main channel of a radar system is operated at a frequency capable of penetrating an opaque barrier such as the wall of a building to sense targets therein. The main channel performance may be impaired by multipath interference, i.e., radar returns resulting from the illumination of targets outside the building by radar radiation reflected from the wall. A guard channel of the radar, operating at a higher frequency which does not penetrate the wall, is used to identify targets outside the building and suppress the multipath interference they produce in the main channel.

In one embodiment, the system includes a main channel configured to be sensitive to targets both on the near side and the far side of a barrier, a guard channel configured to be sensitive to targets on the near side of the barrier, the guard channel operating at a higher frequency than the main channel, and a processing unit for combining signals from the main channel and signals from the guard channel, the processing unit configured to suppress targets detected by both the main channel and the guard channel.

In one embodiment, the processing unit includes a main channel beam former for combining the signals from the main channel receiving antenna elements into a multiplicity of main channel receive beams, and a guard channel beam former for combining the signals from the guard channel receiving antenna elements into a multiplicity of corresponding guard channel receive beams, and the processing unit combines the signal from a main channel receive beam with the signal from the corresponding guard channel receive beam to suppress, in the main channel receive beam signal, targets detected by both the main channel and the guard channel.

In one embodiment, the main channel comprises a main channel transmitting aperture and a main channel receiving aperture, the guard channel comprises a guard channel transmitting aperture and a guard channel receiving aperture, the antenna pattern of the guard channel transmitting aperture is substantially the same as the antenna pattern of the main channel transmitting aperture, and the antenna pattern of the guard channel receiving aperture is substantially the same as the antenna pattern of the main channel receiving aperture.

In one embodiment, a method for mitigating multipath interference in radar for sensing targets through a wall includes operating a main channel at a first frequency to illuminate, and receive reflections from, targets on both sides of the wall, operating a guard channel at a second frequency higher than the first frequency, to illuminate, and receive reflections from, targets on the near side of the wall, processing the main channel reflections with two fast Fourier transforms to generate a main channel range-Doppler map, truncating the main channel range-Doppler map to form a truncated main channel range-Doppler map, processing the guard channel reflections with two fast Fourier transforms to generate a guard channel range-Doppler map, decimating the guard channel range-Doppler map to form a decimated guard channel range-Doppler map, cross-correlating the truncated main channel range-Doppler map and the decimated guard channel range-Doppler map, and suppressing, in the main channel, targets corresponding to signals in the cross-correlation exceeding a threshold.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of the presently preferred embodiments of a high frequency guard channel for interference mitigation in a sense through the wall radar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features. The terms "radio frequency" and "RF" are used herein, for brevity, to include a frequency range spanning from approximately 500 megahertz (MHz) to 100 gigahertz (GHz). The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 1:
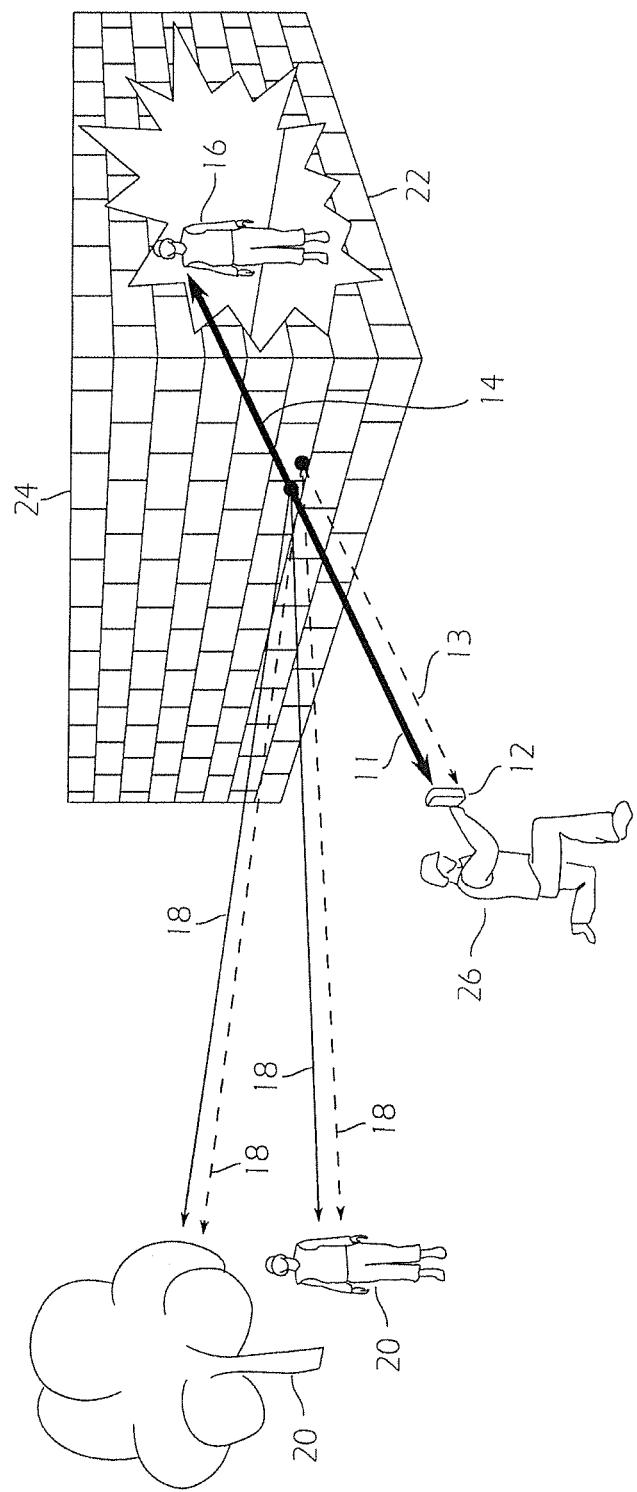
FIG. 1 is a perspective cutaway view of a setting involving the use of a sense through the wall radar outside a building.

Referring to FIG. 1, in one embodiment a sense through the wall radar unit 12 including an interference mitigation system has two channels, a main channel and a guard channel, operating at a lower and higher frequency respectively. Main channel RF radiation 11 travels along a direct propagation path 14 and illuminates a desired target 16 inside a building 22, reflects from the target 16 and travels back to the radar unit 12 along the direct path 14. Radiation from the main channel also travels along one or more indirect propagation paths 18 and illuminates undesired targets 20 outside the building; the radiation reflected from these undesired targets 20 returns to the radar unit 12 along the indirect paths 18 causing multipath interference. The guard channel emits radiation 13 at a higher frequency, with substantially the same radiation pattern as that of the main channel. The guard channel radiation 13 is, because of its higher frequency, substantially incapable of penetrating the wall 24 of the building 22, so that the guard channel senses only undesired targets 20 outside the building, via indirect paths 18. A processing unit in the radar unit 12 may then suppress targets sensed by the main channel that correspond to targets also sensed by the guard channel, and display only the desired target 16 to the operator 26.

The main channel frequency may preferably be sufficiently low to provide adequate transmission through typical walls, while also having a wavelength short enough to provide acceptable angle accuracy, and to provide acceptable antenna gain without requiring a very large aperture. In an exemplary embodiment, the main channel may operate at an S-band frequency of approximately 3 gigahertz (GHz). The guard channel frequency is then chosen to be higher than the main channel frequency, and sufficiently high that the guard channel is attenuated significantly more than the main channel when passing through an exemplary wall. In one embodiment, an X band frequency of 9 GHz may be used for the guard channel. A wall of concrete 15 centimeters (cm) thick, for example, will attenuate 9 GHz radiation approximately 60 dB more than it attenuates 3 GHz radiation. Reflections from targets on the far side of this wall, which pass through the wall twice, will be 120 dB more attenuated in the guard channel than in the main channel; as a result the guard channel is essentially insensitive to targets on the far side of the wall.

The main channel and guard channel may have a single aperture each, used for both transmitting and receiving. In this case the antenna pattern of the guard channel, also known as the radiation pattern of the guard channel antenna, is preferably the same as that of the main channel. It is not necessary that they be precisely identical, but if, for example, the guard channel antenna pattern has a null in a direction in which the main channel does not have a null, then multipath interference caused by radiation received from that direction in the main channel may not be suppressed. Further, it is desirable that if the main channel antenna has a lobe in a particular direction, and is particularly sensitive in that direction, the guard channel also have a lobe, and high sensitivity, in that direction. Generally the antenna patterns may be made similar by using similar radiators, with dimensions scaled in proportion to the wavelength of the channel. For example, if the guard channel frequency is three times the main channel frequency, then guard channel radiators that resemble the main channel radiators, scaled down by a factor of three in their linear dimensions, will produce a similar antenna pattern.

Figure 2:
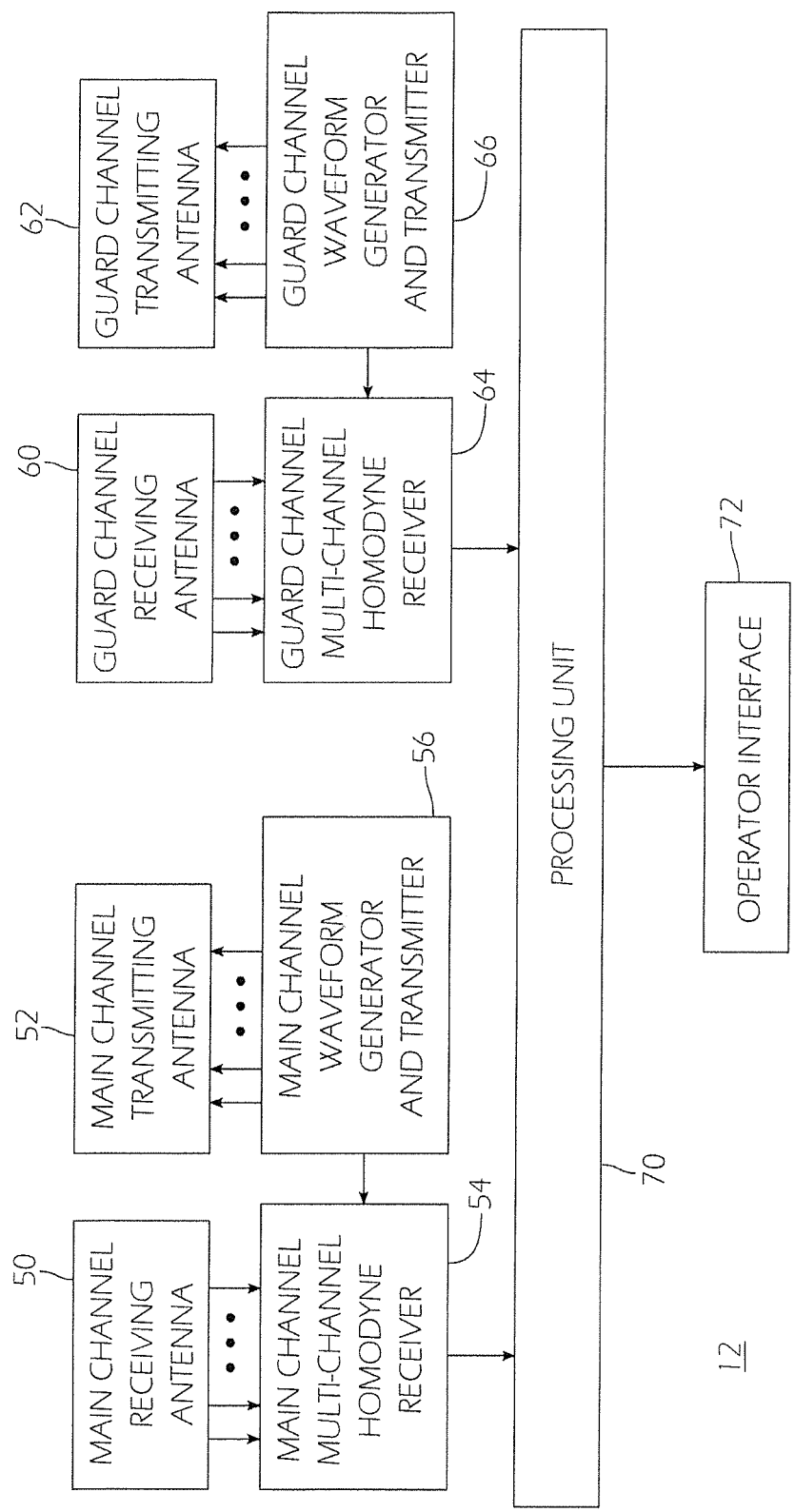
FIG. 2 is a block diagram of a radar unit according to an embodiment of the present invention.

Referring to FIG. 2, the transmitting and receiving antennas may be separate, for the main channel or the guard channel, or both. For example, the main channel transmitting antenna 52 may be a single low-gain element and the main channel receiving antenna 50 may be an array of elements, suitable for operation as a phased array. In the more general case in which the main channel transmitted pattern differs from the main channel received pattern, it is desirable that the product of the received and transmitted patterns in the guard channel be similar to the corresponding prOduct in the main channel. This may be accomplished by matching the patterns of both the transmitting antennas and the receiving antennas. For example, a scaled-down copy of the main channel transmitting antenna 52 may be used as the guard channel transmitting antenna 62, and a scaled-down copy of the main channel receiving antenna 50 may be used as the guard channel receiving antenna 60, where in each case the scaling factor is the ratio of the corresponding wavelengths.

As described in the '378 Application, the main channel transmitting antenna 52 may be driven by a main channel waveform generator 56. The guard channel transmitting antenna 62 may be driven by a guard channel waveform generator 66. The RF analog signals from elements of the main channel receiving antenna 50 may initially be processed by a main channel multi-channel homodyne receiver 54, constructed for example as described in, and illustrated in FIG. 5 of, the '378 Application, with the exception that in the present invention the guard antenna channel may be omitted from the main channel receiver.

The output of the main channel multi-channel homodyne receiver 54 may include several digital data streams, each corresponding to one of the receiving antenna elements. In the guard channel, the RF analog signals from the elements of the guard channel receiving antenna 60 may initially be processed by a similar guard channel multichannel homodyne receiver 64, operating at the guard channel frequency, and generating a digital data stream from each of the guard channel receiving antenna elements. These data streams may be processed by the processing unit 70 and the results communicated to the operator 26 (FIG. 1) through the operator interface 72.

Figure 3:
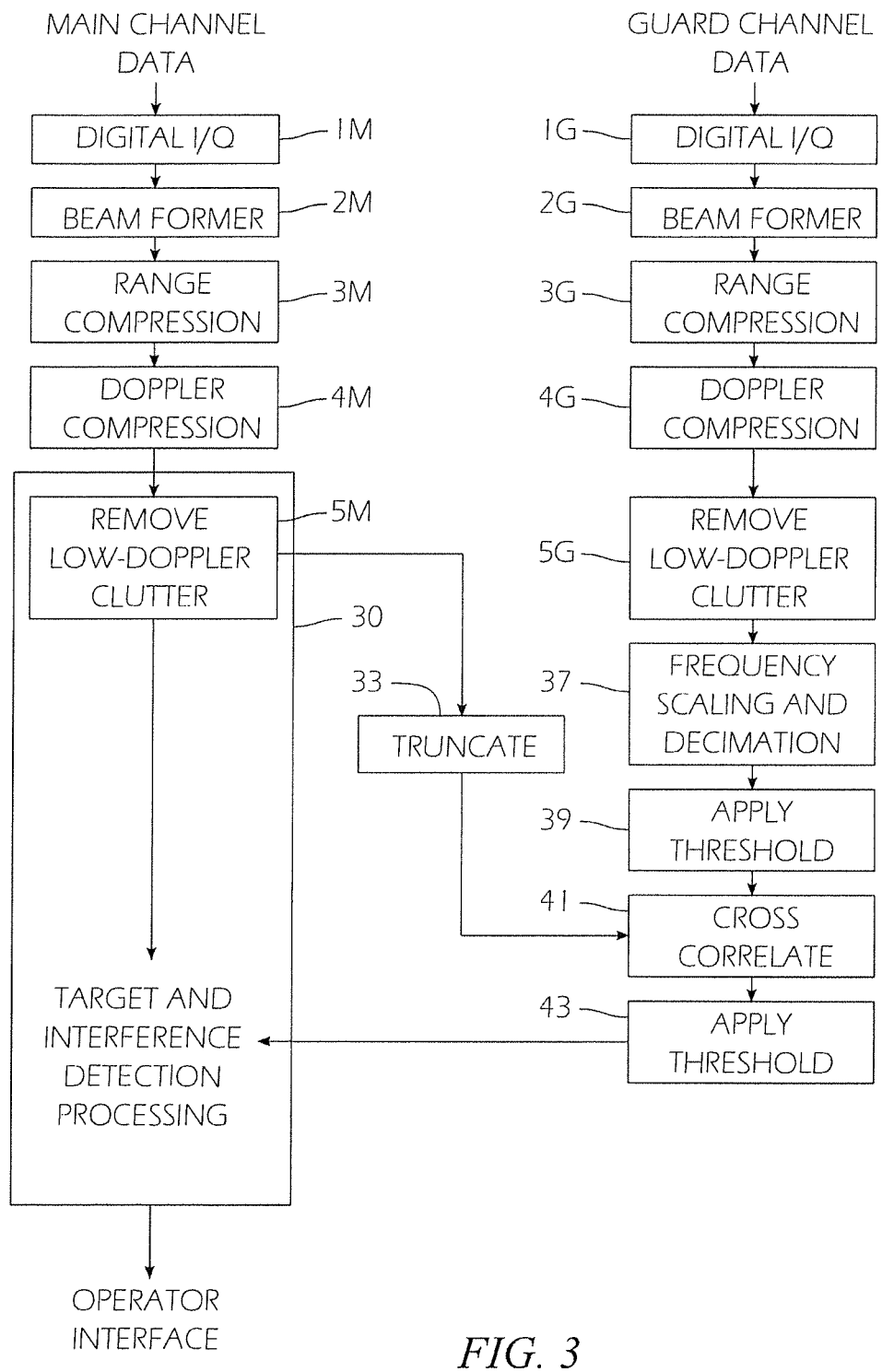
FIG. 3 is a data flow diagram showing signal processing steps used in an embodiment of the present invention to suppress undesired targets.

Referring to FIG. 3, in an exemplary embodiment data streams from main channel and the guard channel receivers are initially processed in parallel paths, in steps 1M through 5M and 33, and in steps 1G through 5G, 37, and 39, before being combined in steps 41, 43, and 30, to mitigate the effects of multichannel interference in the main channel. In the main channel, signal processing for each of the data streams may include an in-phase and quadrature phase (I/Q) detection step 1M. This may be followed by a channel equalization step illustrated and described in the '378 Application, omitted from FIG. 3. Next, in a beam former step 2M, linear combinations of the data streams may be formed, to operate the receive antenna as a phased array receiving simultaneously in multiple beam directions, so that each output stream from the beam former step 2M is the signal received through a different receive beam of the antenna.

Next the signal corresponding to each receive beam may be processed with a range compression fast Fourier transform (FFT) 3M, and a Doppler compression FFT 4M to generate a two-dimensional array of complex numbers known as a range-Doppler map. Each cell in this array is identified by a range index and a Doppler index, and the cell value indicates the amplitude of the radar reflections at or near the corresponding range and Doppler frequency values.

Next, in a low-Doppler clutter removal step 5M, the central Doppler bin, corresponding to zero Doppler frequency, or the central few Doppler bins, may be excised from the array. The first processing steps 1G through 5G in the guard channel may be the same as the corresponding steps 1M through 5M in the main channel.

Because the Doppler frequency is proportional to the carrier frequency, targets with the same range velocity may occur in different Doppler bins of the range-Doppler maps for the main channel and the guard channel which use different radar carrier frequencies. To facilitate the comparison of the range-Doppler maps from the main and guard channels, the guard channel range-Doppler map may be scaled in frequency, and decimated, or under-sampled, in a frequency scaling and decimation step 37, and the main channel range-Doppler map may be truncated, in a truncation step 33.

For example, with 64-point FFTs and a 1.56 Hz Doppler resolution on the main and the guard channel, a target moving with a range velocity of 60 cm per second may fall into Doppler bin 56 in the guard channel, i.e., 24 bins away from bin 32, which can be defined as the zero-velocity Doppler. If the main channel carrier frequency is one-third the guard channel carrier frequency, then in the main channel the same target will fall into Doppler bin 40. In this example, with normalized Doppler resolution between the guard and main channels, there will be Doppler bins in the main channel (bins 1 through 21 and bins 43 through 64 in this example) that do not have unambiguous corresponding Doppler bins in the guard channel due to Doppler frequency scaling versus carrier frequency. These extra Doppler bins in the main channel may be discarded for purposes of interference detection processing. To account for the Doppler scaling, the 64 guard channel Doppler bins are decimated by 3 to create a decimated 21 bin guard channel range-Doppler array. Bin 62 of the guard channel range-Doppler map, being 30 bins from the zero-velocity Doppler bin, corresponds in this example to bin 42 of the main channel range-Doppler map, which is 10 bins from the zero-velocity bin. Both the decimated guard channel range-Doppler map and the truncated main channel range-Doppler map are, in this example, 21×64 arrays, having 21 Doppler bins and 64 range bins. The target velocity per bin in the decimated guard channel range Doppler map directly corresponds to the target velocities in the truncated 21 bin main channel range-Doppler array. As can be seen from this example, the processes of decimating and truncating are simpler if the guard channel frequency is an integer multiple of the main channel frequency.

Next, cells in the decimated guard channel range-Doppler map with amplitudes below a fixed threshold are discarded in a threshold application step 39. This may be done by setting the corresponding cell values to zero, or by deleting the corresponding index values from a valid-cells list. The threshold may be set to be slightly higher than the amplitude expected due to system noise, i.e., the amplitude expected in the absence of reflections from a target.

A cross-correlation step 41 may follow the step of applying a threshold 39. In this step each range bin in the decimated guard channel range-Doppler map is cross-correlated (with zero frequency shift) with the same range bin in the truncated main channel range-Doppler map, to arrive at a correlation coefficient for that range bin. The correlation coefficient r may be calculated for a particular range bin according to the following equation:

$$r = \frac{\sum_i [(x_i - \bar{x})(y_i - \bar{y})]}{\sqrt{\sum_i (x_i - \bar{x})^2} \sqrt{\sum_i (y_i - \bar{y})^2}}$$

where the $x_i$ are the magnitudes of the cell values of the range bin in the main channel, the $y_i$ are the magnitudes of the cell values in the range bin in the guard channel, and $\bar{x}$ and $\bar{y}$ are the means of the magnitudes of the cell values in the range bin in the main channel and guard channel respectively. Here, the magnitude of a complex value is the square root of the sum of the squares of the real and imaginary parts of that complex value. The output of the cross-correlation step 41 is a measure of the extent to which reflections from a particular target appear in both the main channel and the guard channel.

The correlation coefficients generated by the cross-correlation step 41 may then be processed by a threshold application step 43. The output of this step 43 is the set of correlation coefficients which exceed a predetermined threshold, and which therefore represent targets sensed by both the main channel and guard channel, i.e., targets on the near side of the wall. This list of target-ranges is supplied to the target and interference detection processing step 30, in which it may be used to suppress targets that otherwise would be displayed to the operator 26 as representing humans inside the building. The target and interference processing step 30 may be implemented in one embodiment in the manner of step 650 in the '378 Application. The suppression of undesired targets may be accomplished, for example, by suppressing detections occurring in the range bins where interference has been identified.

In an alternate embodiment in which the cross-correlation step 41 is omitted, the output of the threshold application step 39, which contains target detections in the guard channel, corresponding to targets on the near side of the wall, may be fed directly to the target and interference detection processing step 30, where it may be used to suppress the corresponding main channel targets. The process of identifying and suppressing undesired targets may be performed independently in each main channel receive beam using the corresponding guard channel receive beam.

Figure 4:
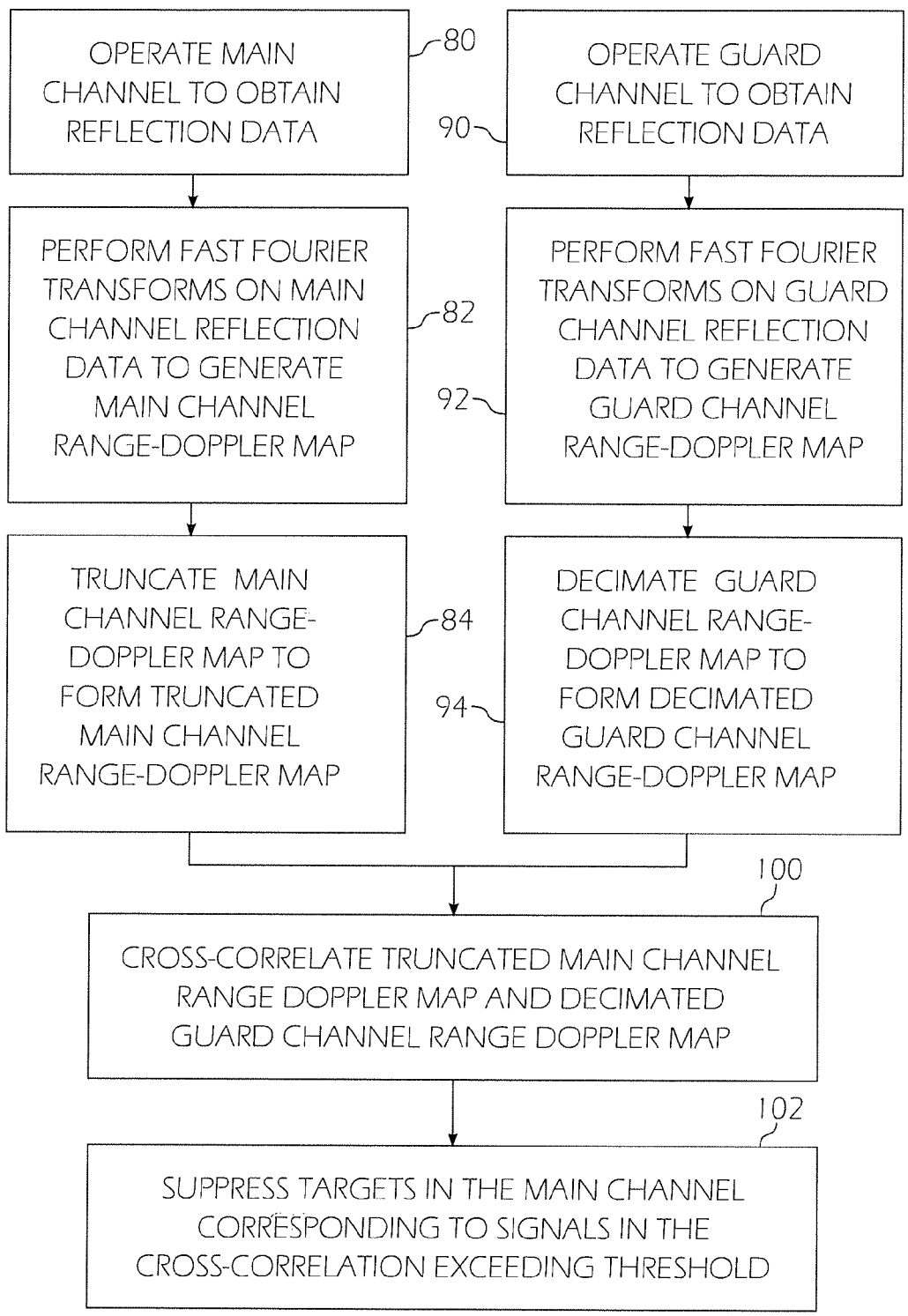
FIG. 4 is a flow chart of a method for mitigating multipath interference according to an embodiment of the present invention.

Referring to FIG. 4, in exemplary embodiment a method for mitigating multipath interference may comprise seven principal steps. With respect to the main channel, in step 80 the main channel is operated to obtain main channel reflection data. In step 82, fast Fourier transforms are performed on the main channel reflection data to generate a main channel range-Doppler map. In step 84, the main channel range-Doppler map is truncated to form a truncated main channel range-Doppler map. With respect to the guard channel, in step 90 the guard channel is operated to obtain guard channel reflection data. In step 92, fast Fourier transforms are performed on the guard channel reflection data to generate a guard channel range-Doppler map. In step 94, the guard channel range-Doppler map is decimated to form a decimated guard channel range-Doppler map. In step 100 the truncated main channel range-Doppler map is cross-correlated with the decimated guard channel range-Doppler map, and in step 102, any targets in the main channel for which the corresponding cross-correlation exceeds a predetermined threshold are suppressed.

Accordingly, it is to be understood that the interference mitigation system constructed according to principles of this invention may be embodied other than as specifically described herein. For example, although the invention has been described in the context of detecting humans inside a building from the outside, it may also be used to detect humans outside a building from the inside, or to detect humans on the other side of a wall or other barrier which is not part of a building. Where in the examples the guard band frequency is triple the main channel frequency it may be a different integer multiple of the main channel frequency, or it may exceed the main channel frequency by a factor that is not an integer. Features disclosed in the '378 Application may be combined with features of the present invention; for example, averaging of the input signals may be used to improve the signal to noise ratio, and motion compensation may be incorporated into the main channel or guard channel or both. The invention is also defined in the following claims.

What is claimed is:

1. A sense through the wall radar system, comprising:
a main channel configured to be sensitive to targets (16,18) both on the near side and the far side of a barrier (24);
a guard channel configured to be sensitive to targets (18) on the near side of the barrier (24), the guard channel operating at a higher frequency than the main channel; and
a processing unit for combining signals from the main channel and signals from the guard channel,
the system configured to:
operate the main channel at a first frequency to illuminate, and receive reflections from, targets on both sides of the wall;
operate the guard channel at a second frequency higher than the first frequency, to illuminate, and receive reflections from, targets on the near side of the wall;
process the main channel reflections with two fast Fourier transforms to generate a main channel range-Doppler map;
truncate the main channel range-Doppler map to form a truncated main channel range-Doppler map;
process the guard channel reflections with two fast Fourier transforms to generate a guard channel range-Doppler map;
decimate the guard channel range-Doppler map to form a decimated guard channel range-Doppler map; and
suppress in the main channel targets corresponding to signals, in the decimated guard channel range-Doppler map, exceeding a threshold.

2. The system of claim 1, wherein:
the main channel comprises a main channel transmitting aperture and a main channel receiving aperture;
the guard channel comprises a guard channel transmitting aperture and a guard channel receiving aperture;
the antenna pattern of the guard channel transmitting aperture is substantially the same as the antenna pattern of the main channel transmitting aperture; and
the antenna pattern of the guard channel receiving aperture is substantially the same as the antenna pattern of the main channel receiving aperture.

3. The system of claim 2, wherein the main channel receiving aperture comprises an array of main channel receiving antenna elements and the guard channel receiving aperture comprises an array of guard channel receiving antenna elements.

4. The system of claim 3 wherein the processing unit comprises:
a main channel beam former (2M) for combining the signals from the main channel receiving antenna elements into a plurality of main channel receive beams, and
a guard channel beam former (2G) for combining the signals from the guard channel receiving antenna elements into a plurality of guard channel receive beams.

5. The system of claim 4, wherein the processing unit combines the signal from a main channel receive beam with the signal from the corresponding guard channel receive beam to suppress, in the main channel receive beam signal, targets detected by both the main channel and the guard channel.

6. The system of claim 1, wherein the main channel frequency is in the S band and the guard channel frequency is in the X band.

7. A method for using radar to sense targets through a wall, comprising:
operating a main channel at a first frequency to illuminate, and receive reflections from, targets (16,18) on both sides of the wall;
operating a guard channel at a second frequency higher than the first frequency, to illuminate, and receive reflections from, targets (18) on the near side of the wall;
processing the main channel reflections with two fast Fourier transforms (3M, 4M) to generate a main channel range-Doppler map;
truncating (33) the main channel range-Doppler map to form a truncated main channel range-Doppler map;
processing the guard channel reflections with two fast Fourier transforms (3G, 4G) to generate a guard channel range-Doppler map;
decimating (37) the guard channel range-Doppler map to form a decimated guard channel range-Doppler map;
suppressing in the main channel targets corresponding to signals, in the decimated guard channel range-Doppler map, exceeding a threshold.

8. The method of claim 7, wherein the guard channel frequency is an integer multiple of the main channel frequency.

9. The method of claim 8, wherein the step of decimating (37) the guard channel range-Doppler map is accomplished by preserving 1 of every N of the Doppler bins of the range-Doppler map, where N is the ratio of the guard channel frequency to the main channel frequency.

10. The method of claim 7, wherein the step of truncating (33) the main channel range-Doppler map is accomplished by removing, from the main channel range-Doppler map, Doppler bins with high index values and Doppler bins with low index values, to an extent resulting in a truncated main channel range-Doppler map having the same dimensions as the decimated guard channel range-Doppler map.

11. A method for mitigating multipath interference in radar for sensing targets through a wall (24), comprising:
   operating a main channel at a first frequency to illuminate, and receive reflections from, targets (16,18) on both sides of the wall (24);
   operating a guard channel at a second frequency higher than the first frequency, to illuminate, and receive reflections from, targets (18) on the near side of the wall;
   processing the main channel reflections with two fast Fourier transforms (3M, 4M) to generate a main channel range-Doppler map;
   truncating (33) the main channel range-Doppler map to form a truncated main channel range-Doppler map;
   processing the guard channel reflections with two fast Fourier transforms (3G, 4G) to generate a guard channel range-Doppler map;
   decimating (37) the guard channel range-Doppler map to form a decimated guard channel range-Doppler map;
   cross-correlating (41) the truncated main channel range-Doppler map and the decimated guard channel range-Doppler map; and
   suppressing, in the main channel, targets corresponding to signals in the cross-correlation exceeding a threshold.

12. The method of claim 11, wherein the guard channel frequency is an integer multiple of the main channel frequency.

13. The method of claim 12, wherein the step of decimating (37) the guard channel range-Doppler map is accomplished by preserving 1 in N of the Doppler bins of the range-Doppler map, where N is the ratio of the guard channel frequency to the main channel frequency.

14. The method of claim 13, wherein the step of truncating (33) the main channel range-Doppler map is accomplished by removing from the main channel range-Doppler map Doppler bins with high index values and Doppler bins with low index values, to an extent resulting in a truncated main channel range-Doppler map having the same dimensions as the decimated guard channel range-Doppler map.

* * * * *